Jan. 10, 1956  E. W. HOGUE  Re. 24,252

HYDRAULIC MOTORS 2,730,076

Filed May 31, 1952  2 Sheets—Sheet 1

INVENTOR.
EPHRAIM W. HOGUE
BY
*J. H. Fowler*
ATTORNEY

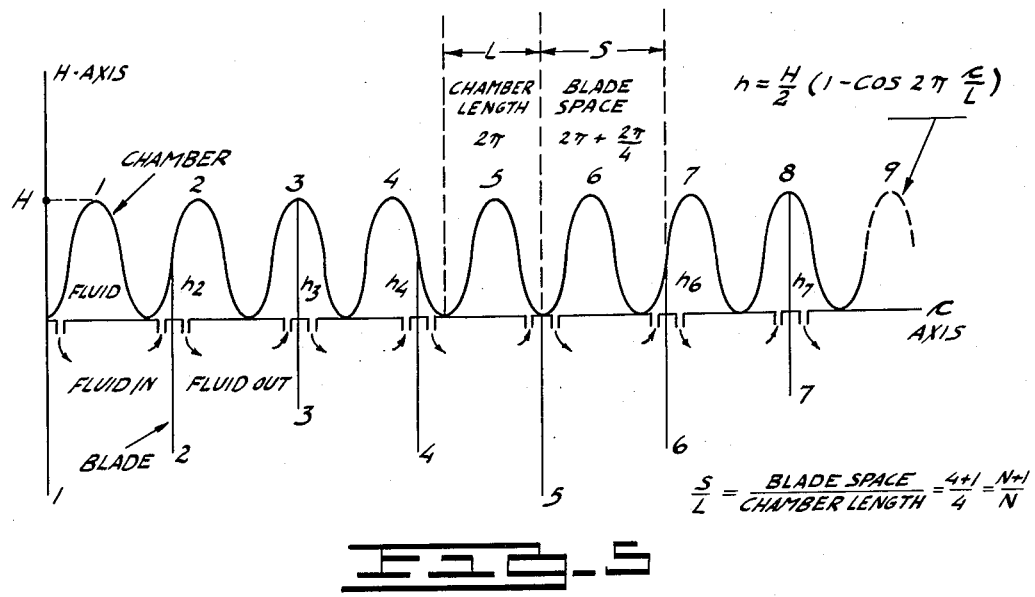
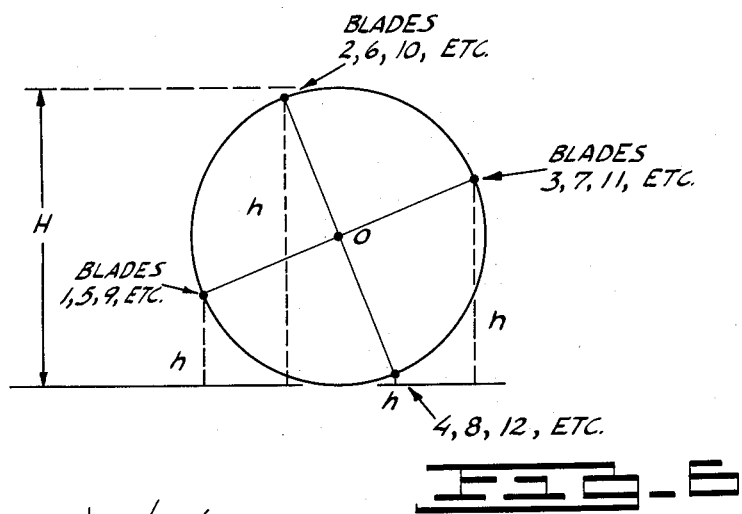
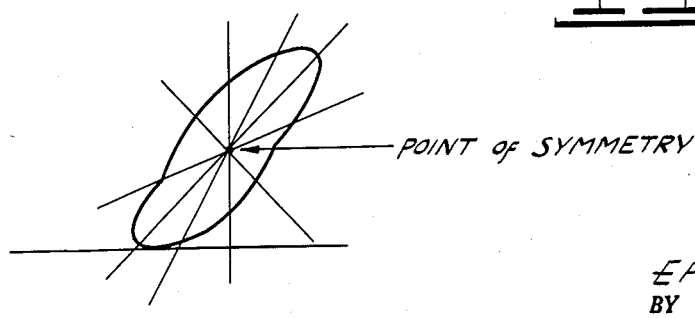
INVENTOR.
EPHRAIM W. HOGUE
BY
*O. H. Fowler*
ATTORNEY

United States Patent Office 2,730,076
Patented Jan. 10, 1956

2,730,076

HYDRAULIC MOTORS

Ephraim W. Hogue, Bethesda, Md.

Application May 31, 1952, Serial No. 290,870

8 Claims. (Cl. 121—56)

This invention relates to hydraulic motors.

Broadly, the invention comprehends a hydraulic motor of simple, compact and durable structure including but few parts which may be easily manufactured and quickly assembled. The invention further comprehends a hydraulic motor which is light in weight, simple in principle, as well as in structure, and yet capable of delivering large torques. A motor which may be operated on a small volume of fluid and which is capable of running smoothly at high speeds with little, if any, vibration. It has no slippage and it will deliver a substantially constant torque when working under a constant fluid pressure differential.

The motor has the advantage of a positive control by controlling the flow of fluid therethrough. That is, the angle of rotation depends only on the volume of fluid passed through the motor and as a result, the motor may be braked by throttling its exhaust. It may be reversed by simply reversing the fluid flow to it, and it may also be used as a pump.

An object of the invention is to provide a relatively small motor, light in weight, mechanically rugged and highly efficient in performance.

Another object of the invention is to provide a hydraulic motor having a minimum number of parts and a minimum of close tolerances so that the manufacture thereof in machining of the parts may be reduced to the lowest possible extent.

Other objects and advantages of the invention will appear from the following description when taken in connection with the accompanying drawings forming a part of this specification, and in which:

Figures 5 and 6 are diagrams of a hypothetical motor from which the motor illustrated in Figures 1–4 was devised; and Figure 7 is a diagram illustrating the point of symmetry.

Figure 1:
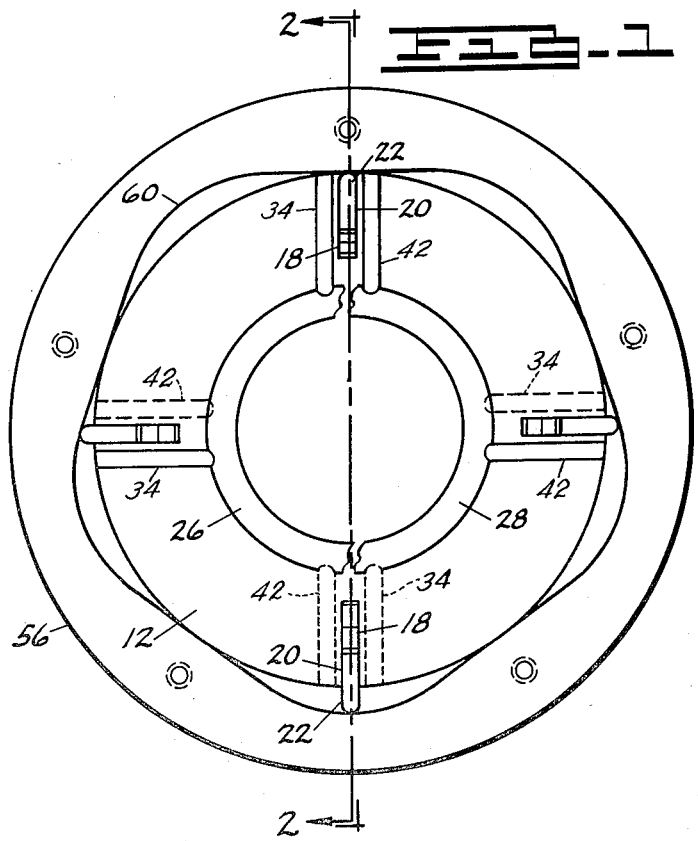
Fig. 1 is a vertical sectional view partly broken away.

Referring to the drawings for more specific details of the invention, 10 indicates a base which may be fixedly secured in any desirable manner. The base supports a stator 12. As shown, the stator is a cylindrical body, the periphery 14 and ends 16 of which are machined and polished (not indicated in drawing).

Equi-spaced slots 18 are arranged in the peripheral face 12 of the stator and blades 20 reciprocal in the slots have their outer edges rounded as indicated at 22, the purpose of which will hereinafter appear. The blades are urged radially outward by springs 24 interposed between the blades and the bottoms of the slots. The springs may be of any desired type, however, leaf springs are preferred because such springs tend to equally distribute the force applied to the blade and thus avoid cocking and/or binding of the blade in the slot.

Spaced annular passages 26 and 28 comprising an inlet manifold and an outlet manifold respectively are arranged in the core of the stator in parallel relation to one another and in concentric relation to the stator. An intake passage 30 communicates with the annular passage 26 and leads to an intake port 32 preferably arranged in the base 10, and radially disposed passages 34 each communicating with the annular passage 26 and terminate in flared inlet apertures or nozzles 36 having a width substantially commensurate to that of the blades 20 and the nozzles discharging at the perimeter of the stator, one immediately back of each blade. Correspondingly, an exhaust or a discharge passage 38 communicates with the annular passage 28 and leads to a discharge port 40 arranged in the base 10, and radially disposed passages 42 each communicating with the annular passage 28 terminate in outlet apertures or scavenger nozzles 44 each having a width commensurate to that of a blade 20 and each opening at the perimeter of the stator, one immediately forward of each blade.

Oppositely disposed annular slots 46 and 48 arranged in the ends 16 of the stator each receive a ring 50 seated on a ribbon spring 52 resting on the bottom of the slot. Preferably the rings 50 are made of graphite bronze. They should be narrow in cross section and of as small diameter as possible taking into consideration the overall size of the motor. The rings 50 function as fluid seals between the stator and the rotor. While a specific fluid seal has been described, it is to be understood that other types may be employed. However, the structure hereinabove described would offer the optimum of friction.

A rotor indicated generally at 54 includes a heavy ring 56, having an inner circumferential channel 58 of a width complementary to that of the blades 20, and a flange 60 normal to one edge thereof and flapped against one end of the stator and bearing against the graphite bronze ring 50 in the annular slot 46 so as to inhibit seepage of fluid from the motor.

The channel 58 is so contoured as to provide in effect a plurality of successive chambers 60 characterized in that they correspond to one another and present continuous sine curve surfaces receiving the free ends of the blades 20 with line contacts so as to reduce friction to a minimum, and further characterized in that the number of chambers 60 thus provided exceed the number of blades 20 by one.

It is to be observed that when using the term chamber 60 to define the space between the lines of contact of the stator with the rotor, the ratio of the length S of the space between the blades 20 measured along the perimeter of the stator, to the chamber length L also measured along the perimeter of the stator is made $$\frac{S}{L} = \frac{N+1}{N}$$

where N is a whole number. As a result of this the blades will not occupy identical positions in the chambers. The positions of the blades will be progressive, each blade being a distance $$\frac{L}{N}$$

farther along in the chamber than the preceding one, in the manner of a vernier.

It should also be observed that the chambers present continuous sine and/or cosine curves and that since the distance measured along the perimeter of the stator between the contact lines of the stator and the rotor constitutes a single chamber length designated L and corresponding to $2\pi$ radians, the position of a blade in the chamber can be specified by its phase angle with respect to the origin of the curve. Thus it is clear that if $$\frac{S}{L}=\frac{N+1}{N}$$

the blades will occupy N different phases at all times, the phase of each blade differing by an angle of $$\left(2\pi+\frac{2\pi}{N}\right)$$

radians from that of the adjacent blades. Thus each blade carries a proportion of the load depending upon its phase and it can be shown that the total force exerted by all blades (provided they are equally spaced) is constant, accordingly, the torque produced by the motor when working under constant fluid pressure differential, is constant.

To aid in understanding the principle of operation of the fluid motor, Figures 5 and 6 and the following description of the operation of a hypothetical engine from which the rotary fluid motor of Figures 1, 2, 3, and 4 was derived is provided.

Figure 5 shows the cross-section of a hypothetical engine made up of two blocks A, and B. A presses firmly against B and presents to it the regularly repeating smooth curved surface shown. A series of blades sliding in equally spaced slots in B, and free to move up and down, are pressed against the camlike surface of A by spring tension. If now a fluid is forced into the spaces between A and B to the left of each blade while it is allowed to leave the spaces to the right of each blade, A will be made to move to the left, if B is held stationary.

In order that it shall always remain impossible for fluid to flow directly from inlet to outlet, these being located in B close to each blade, it is necessary that the distance between the contacts of A with B be shorter than the distance between the blades. S must be greater than L in Figure 5.

Further, in order that the total force urging A to the left be constant as A moves (assuming constant fluid pressure differential) it can be seen that the total blade area projecting above B must not vary. Whether the total blade area remains constant or not depends upon the shape of the regularly repeating camlike surface in block A. If the rotary fluid motor derived from the hypothetical one (in a manner to be described below) is not to be restricted to an even number (divisible by 2) of blades, there is only one curve shape which will maintain the total blade area projecting above B constant. This curve is the sine or cosine curve. If the number of blades in the rotary engine is restricted to an even value, other curves of a special class will maintain constant total active blade area. This class includes the sine or cosine curve as a special case. Because the sine or cosine curve does not restrict the blades to an even number and because it is the smoothest possible curve giving a minimum of acceleration to the blades it will be chosen as the shape of the regularly repeating surface in block A.

Using the term chamber for the open space in A between the points of contact of A with B, it can be seen that if the ratio of the distance S between the blades, to one chamber length L is made $$\frac{S}{L}=\frac{N+1}{N}$$

where N is a whole number, the blades will not all occupy identical positions in the chambers. Their positions will be progressive, each blade being a distance L/N farther along in its chamber than the preceding one in the manner of a vernier. The 1st, 5th, 9th and 13th etc. blades will occupy identical positions in their respective chambers; as will the 2nd, 6th, 10th, 14th and so on. If the surface of A is a sine or cosine curve, the distance L between successive contact points of A with B, corresponds to $2\pi$ radians. One chamber is then $2\pi$ radians long. The position of the blade in its chamber can be specified by its phase angle with respect to the origin of the curve. It can be seen that if $$\frac{S}{L}=\frac{N+1}{N}$$

the blades will occupy N different phases at all times, the phase of each blade differing by an angle of $(2\pi+2\pi/N)$ radians from that of its neighbor. See Figure 5.

Figure 6 shows the generating circle for the curve in Figure 5. Here are shown also the phase relations of the blades by the four equally spaced points on the circle corresponding to the $N=4$ distinct phases of the particular engine shown. Causing the four points to travel around the generating circle is equivalent to sliding A along B in Figure 5. It can be seen from the symmetry of the circle and equally spaced phase points that the total blade area, that is:

blade width times $(h_1+h_2+h_3+h_4+h_5+$ etc.)

will be constant as A moves provided the number of blades engaging A is evenly divisible by N, and that it will be constant whether N is even or odd. This is true only for the circle as a generating figure, and hence only for the sine or cosine cam curve. However, if N is even, corresponding to an even number of blades in the rotary motor, cam curves derived from generating curves which have a point of symmetry will provide constant total active blade area. B point of symmetry is meant a point which bisects all the line segments through it which are bounded by the generating curve. The point of symmetry for the circle bisects all its diameters. See Figure 7 for a curve which is not a circle, but which has a point of symmetry. Not all closed curves have points of symmetry.

Figure 2:
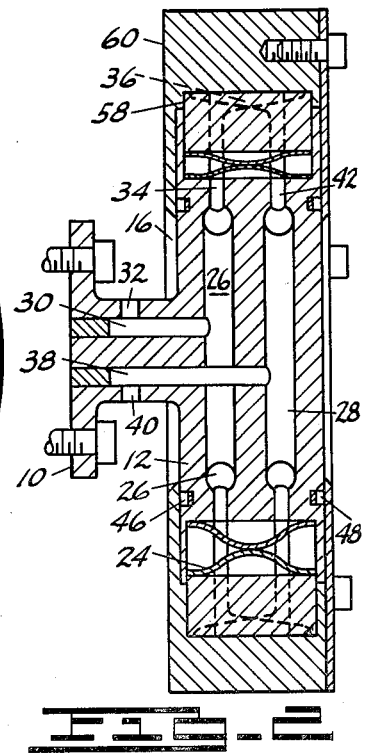
Fig. 2 is a cross sectional view.
Figure 3:
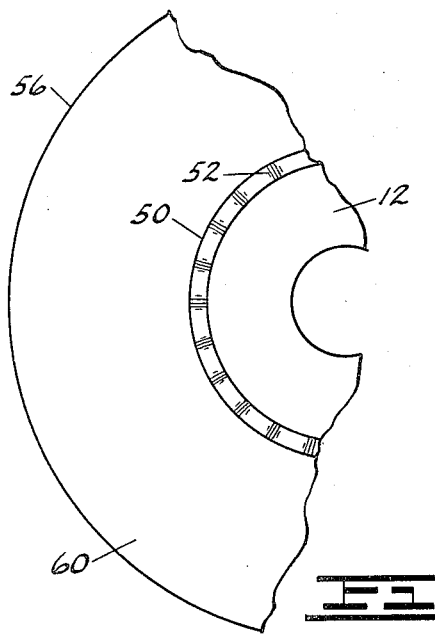
Fig. 3 is a perspective view partly broken away.
Figure 4:
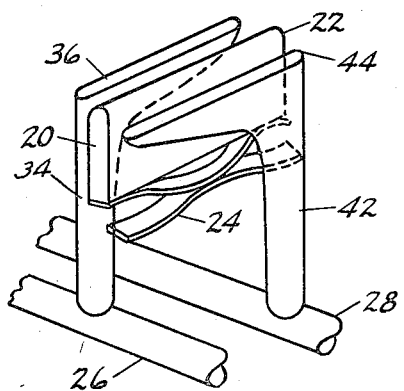
Fig. 4 is a perspective view illustrating a detail of the fluid system and its relation to the reciprocal blades.

The motor shown in Figure 5 would of course require an indefinitely large number of chambers and blades in order to run continually, but if a section of it containing $N+1$ complete chambers and N blades is cut out and wrapped around a cylinder in such a manner that the section of c-axis cut off forms the circumference of the cylinder (so that the $n$th and the $(n+N)$th blades coincide), a continually running motor results. Figures 1, 2, show the result for $N=4$. The principle of operation would be the same for $N=6$, a motor having six blades and seven chambers with six distinct phases; or for $N=7$, a motor having seven blades and eight chambers with seven distinct phases; for $N=8$, etc. The particular requirements to be put on the motor would determine the number of blades and chambers used. A motor might also be constructed for which the number of blades and chambers would be well in excess of the number of phases N by cutting off several repeating segments of a figure such as Figure 5. In this case the total number of chambers in the rotor would exceed the total number of blades in the stator by a number equal to the number of complete phase sets employed in the motor. Obviously the particular requirements of the motor would determine the number of blades and chambers to be used. However, it is desirable to keep the number of blades rather small so as to reduce friction and to give ample room for the blades and the inlet and outlet circuits. It is believed that the optimum number of blades for most uses should be four.

In operation, fluid delivered to the inlet port 32 flows through the intake passage 30 into the annular passage 26, thence through the radially disposed passages 34 and the nozzles 36 into the chambers 60 back of the blades 20, introducing pressure in the chambers 60 resulting in driving the rotor, and fluid in the chambers 60 forward of the blades is displaced from the chambers into the nozzles 44 thence through the radial passages 42, the annular passage 28, the discharge passage 38 and discharge port 40, thus completing the cycle.

While I have shown and described a preferred embodiment of my invention, I wish it to be understood that I do not confine myself to the precise details of construction herein set forth by way of illustration, as it is apparent that many changes and variations may be made therein by those skilled in the art, without departing from the spirit of the invention or exceeding the scope of the appended claims.

Having thus described the invention, what I claim as new and desire to secure by Letters Patent is:

1. A hydraulic power converter comprising a stator including a cylindrical body having equi-spaced radially disposed slots, blades reciprocal in the slots, a rotor co-operating with said stator and including a ring having a channel contoured to provide sine or cosine cam surfaces constituting chambers for the reception of the blades, there being N+1 chambers for every N blades, means urging the blades radially outward, means for delivery of all of the fluid supplied to any chamber back of the respective blades and means for discharge of all of the fluid in each chamber immediately forward of the respective blades, the variation in spacing of said rotor and stator surfaces being such that the sum of the exposed areas of all the slidable blades in said chambers remains substantially constant during rotation of said rotor.

2. A hydraulic power converter comprising a fixed support, a stator thereon, sets of equi-spaced blades in the stator, means urging the blades in one direction of movement, a rotor receiving the stator, chambers in the rotor consisting of successive sine or cosine cam surfaces, the number of chambers coacting with each set of blades exceeding the number of blades of said set by one the arrangement of blades and surfaces being such that the sum of exposed areas of all the blades in said chambers remains substantially constant during rotation of said power converter, and a hydraulic fluid circuit in the stator for flow of fluid to and from the chambers consisting of respective inlet and outlet apertures immediately adjacent to and on opposite sides of the respective blades, an inlet manifold, an outlet manifold, and unobstructed valve-free passages from the respective said inlet and outlet apertures to the respective inlet and outlet manifolds.

3. A hydraulic power converter comprising a stator and a rotor, the relation of one to the other being such as to provide contiguous chambers, a plurality of equi-spaced vanes slidably mounted in said stator and movable between the stator and the rotor to partition and seal the chambers, the relationship of the vanes to the chambers being such as to present a constant total active vane area, a fluid inlet on one side of and adjacent each vane and a fluid outlet on the other side of each vane, fluid inlet and outlet passages leading to said inlets and outlets respectively, said fluid inlet and outlet passages being entirely free during normal operation.

4. A hydraulic fluid power converter having a stator and a rotor concentric therewith, said stator having a surface of revolution and said rotor having a coacting surface opposed to said surface of revolution, said coacting surface being contiguous to said surface of revolution at a number of equally spaced first points and spaced from said surface of revolution at gradually increasing distances intermediate said points to a maximum distance between said points, side walls to define with said surfaces a series of chambers corresponding in number to the number of said spaced points, a series of slots in said stator, a blade in each said stator slot slidably biased toward said rotor and extending between said side walls into contact with said coacting surface of said rotor to divide each said chamber into fluid-tight sections, there being N blades for every N+1 chambers, fluid inlet and outlet means for said chambers consisting entirely of a fluid inlet passage in said stator adjacent each blade on one side thereof and a fluid outlet passage adjacent each blade on the other side thereof from the inlet passage, the variation in spacing of said rotor and stator surfaces being such that the sum of exposed areas of all the slidable blades in said chambers remains substantially constant during rotation of said rotor.

5. A hydraulic fluid power converter having a stator and a rotor concentric therewith, said stator having a surface of revolution and said rotor having a coacting surface opposed to said surface of revolution, said coacting surface being contiguous to said surface of revolution at a number of equally spaced first points and spaced from said surface of revolution at gradually increasing distances intermediate said points to a maximum distance between said points, side walls to define with said surfaces a series of chambers corresponding in number to the number of said spaced points, a series of slots in said stator, a blade in each said stator slot slidably biased toward said rotor and extending between said side walls into contact with said coacting surface of said rotor to divide each said chamber into fluid-tight sections, the number of blades being less than the number of chambers, fluid inlet and outlet means for said chambers consisting entirely of a fluid inlet passage in said stator adjacent each slide on one side thereof and a fluid outlet passage adjacent each slide on the other side thereof from the inlet passage, the variation in spacing of said rotor and stator surfaces being such that the sum of exposed areas of all the slidable blades in said chambers remains substantially constant during rotation of said rotor, said inlet and outlet passages terminating on the stator surface in slots extending substantially completely between said side walls.

6. The invention according to claim 5, said inlet and outlet passages extending respectively from said slots into respective inlet and outlet manifolds in said stator.

7. The invention according to claim 4, said chambers being identical and the cross sectional area of each such chamber varying symmetrically from zero at said equally spaced points to a maximum between said points as a sine function.

8. A hydraulic fluid power converter having a stator member and a rotor member, one of which has a surface of revolution and the other of which has a coacting surface opposed to said surface of revolution, said coacting surface being contiguous to said surface of revolution at a number of equally spaced points and being spaced from said surface of revolution at gradually increasing distances which vary with the angle of revolution according to a mathematical function to a maximum distance between said points, side walls to define with said surfaces a series of chambers corresponding in number to the number of said spaced points, the member having a surface of revolution containing a series of slots, a blade in each said slot slidably biased toward the other said member and extending between said side walls into contact with the coacting surface of said other member to divide each said chamber into fluid-tight sections, there being N+1 chambers for every N blades, fluid inlet and outlet means for said chambers consisting entirely of a fluid inlet passage adjacent each blade on one side thereof and a fluid outlet passage adjacent each blade on the other side thereof from the inlet passage, the variation in spacing of such coacting surfaces being such that the sum of the exposed areas of all the slidable blades in said chambers remains substantially constant during rotation of said rotor.

References Cited in the file of this patent

UNITED STATES PATENTS

| Number | Name | Date |
|---|---|---|
| 385,805 | Gregersen et al. | July 10, 1888 |
| 615,664 | Dearing | Dec. 6, 1898 |
| 693,348 | Dearing | Feb. 11, 1902 |
| 803,599 | Jungersen et al. | Nov. 7, 1905 |
| 859,744 | Cottrell | July 9, 1907 |
| 868,841 | Calkins | Oct. 22, 1907 |
| 1,536,737 | Williams | May 5, 1925 |
| 2,435,827 | Greubel | Feb. 10, 1948 |